June 3, 1947.  J. C. SCHELLENG  2,421,394
DISTANCE MEASURING SYSTEM
Filed June 10, 1942
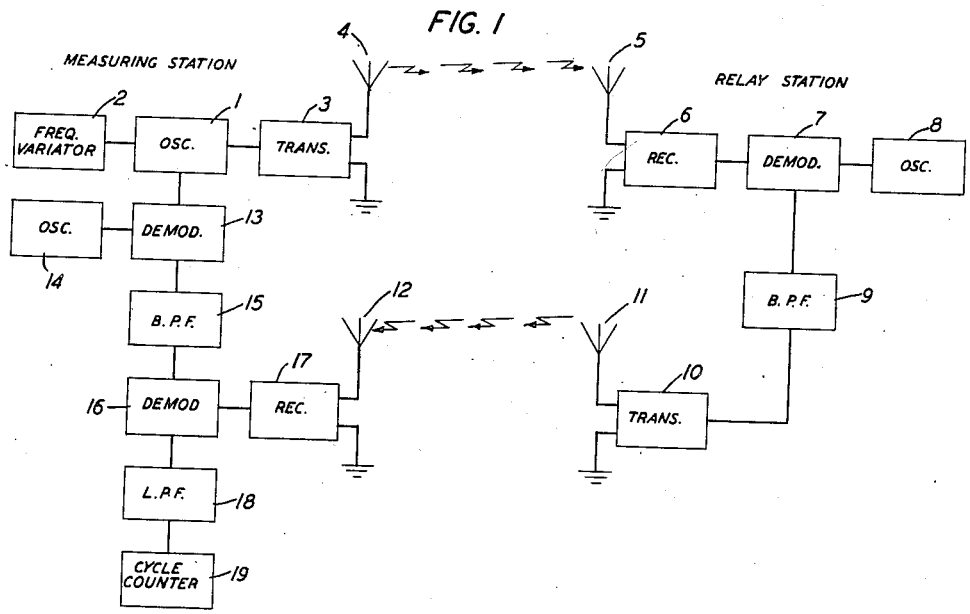
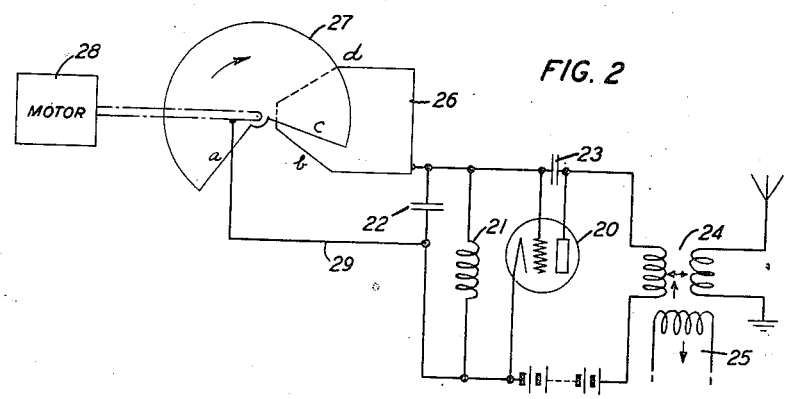
INVENTOR
J. C. SCHELLENG
BY
W. Dawson
ATTORNEY Patented June 3, 1947

2,421,394

UNITED STATES PATENT OFFICE 2,421,394

DISTANCE MEASURING SYSTEM

John C. Schelleng, Interlaken, N. J., assignor to Bell Telephone Laboratories, Incorporated, New York, N. Y., a corporation of New York Application June 10, 1942, Serial No. 446,466

3 Claims. (Cl. 250—1.68)

This invention relates to distance measuring systems, and particularly to systems in which the distance between moving bodies is measured by radiated waves.

The object of the invention is to compensate for or eliminate the change in frequency in the received waves due to the relative motion between the bodies.

A feature of the invention is the algebraic addition to the frequency of the received waves of a frequency adjusted to compensate for, or eliminate, the change in frequency.

When two bodies are moving relatively to each other so as to change the distance between them and a wave is radiated from one body to the other, it is well known that the frequency of the received wave differs from the frequency of the radiated wave, due to the relative velocity of the bodies. This change in frequency is known as the "Doppler effect." In United States Patent 1,495,616, May 27, 1924, F. G. Simpson, the change in frequency of the received waves is used to measure the relative velocity between the bodies, by combining the received waves with locally generated waves having the frequency of the radiated waves to produce a beat frequency equal to the change in frequency. In United States Patent 2,134,716, November 1, 1938, R. Gunn, the change in frequency of the received waves is used to measure the relative velocity between the bodies, and this measure is then used to determine the distance between the bodies. In Gunn's patented system, a wave is radiated from one body to the other, relayed back from the second body to the first body and then combined with the radiated wave. The frequency of the radiated wave is varied until the beat frequency between the received wave and the radiated wave is reduced to zero. The rate of change of the frequency of the radiated wave is a measure of the distance between the bodies.

The present invention distinguishes from prior systems of this character in that the distance between the bodies is measured by some relationship between the radiated and received waves other than the change in frequency due to the Doppler effect, and that the transmitted waves are combined with locally generated waves to compensate for, or eliminate, the change in frequency due to the Doppler effect.

For convenience of description, the invention is disclosed in connection with the transmission of radio waves, but it is not limited thereby, and may be adapted to systems using waves of other frequencies, and waves transmitted by other mediums, such as air, water, etc.

In a specific embodiment of the invention, waves are transmitted from the first body to the second body, received on the second body, changed in frequency, and retransmitted to the first body. On the first body, a part of the waves from the transmitter is changed in frequency and combined with the received waves. By adjusting the changes in frequency of the waves at either or both of the two bodies, until the beat frequency of the combined waves is reduced to zero, the Doppler effect is eliminated. The frequency of the transmitted waves is then varied over a predetermined range, and the number of beats occurring between the transmitted and received waves is counted. This number is a measure of the distance between the bodies.

Either or both of the bodies may be moving, but, if the Doppler effect is present, there must be a movement of the bodies relative to each other.

The invention will be better understood from the following description, taken in connection with the drawings, in which:

Fig. 1 diagrammatically shows a system embodying the invention;

Fig. 2 schematically shows the oscillator and frequency variator forming part of the system shown in Fig. 1.

The oscillator 1 produces waves of a frequency suitable for the transmission medium used, and the accuracy desired. For short distances, and particularly for transmission through water or air, this frequency may be relatively low, in some cases, even within the audible range. For longer distances and greater accuracy, the frequency of the oscillator 1 may be in the radio range, and may even be in the ultra-high frequency range above say 1000 megacycles per second.

The frequency variator 2 controls the oscillator 1 so that the generated frequency is constant for a time, then increases uniformly to a higher value, remains constant at this latter value for a time, then decreases to the first value.

The waves generated by the oscillator 1 may be amplified if desired in the power transmitter 3, and are radiated from the antenna 4 to the antenna 5 of the relay station.

The waves transmitted to the antenna 5 are selected by the radio receiving set 6 and supplied to a balanced demodulator 7. The waves supplied to the demodulator 7 are combined with waves generated by the local oscillator 8. One of the side bands produced by the demodulator 7 is selected by the band-pass filter 9, amplified, if desired, in the transmitter 10, and radiated from the antenna 11 to the antenna 12.

A portion of the output of the oscillator 1 is combined in the demodulator 13 with locally generated waves from the oscillator 14, one side band is selected by the band-pass filter 15 and supplied to the demodulator 16.

The waves from the antenna 12 are selected by the receiving set 17 and supplied to the demodulator 16, where these waves are combined with the waves from the filter 15. One side band of the combined waves is selected by the low-pass filter 18 and supplied to a counter 19 which counts the number of cycles in the selected side band during one sweep of the frequency variator 2. The number of cycles counted is a measure of the distance between the antennae 4, 12 and the antennae 5, 11.

Before commencing the sweep in frequency, the frequency variator 2 is stopped or disabled so that a constant frequency preferably in the middle of the transmitted band, is generated by the oscillator 1, and the oscillator 14 is adjusted until the beat frequency selected by the filter 18 and transmitted to the counter 19 is reduced to zero. Assuming that the relative velocity between the two bodies is constant in magnitude and direction, this adjustment of the oscillator 14 will compensate for the change of frequency due to the Doppler effect. Leaving the oscillator 14 as adjusted, the frequency variator 2 is placed in operation, sweeping the frequency of the oscillator 1 over the desired range. The number of cycles of the beat frequency counted by the counter 19 will then be a measure of the distance.

Fig. 2 shows a type of oscillator and frequency variator suitable for use in the present system. The disclosure of this oscillator and variator is intended to be purely illustrative of one device suitable for this purpose, and not as any limitation on the scope of the invention as many other known types of oscillators and frequency variators may obviously be substituted for that shown.

The oscillator shown in Fig. 2 comprises an amplifier 20 associated with the usual tuned grid circuit comprising the inductor 21 and capacitor 22, a feedback capacitor 23, and output transformer 24. The output transformer 24 may have an extra winding 25, for supplying waves to the demodulator 13, or this supply may be tapped off some other part of the circuit. The usual power supplies, biasing resistors, and other circuit elements commonly used with such oscillators are well known and for clarity have been omitted.

A variable capacitor formed by a fixed plate, or plates, 26 and a rotatable plate, or plates, 27 is connected in parallel relationship with the tuning capacitor 22. The rotatable plate 27 is driven by, but insulated from the shaft of a suitable motor 28. The connection 29 from the capacitor 22 to the plate 27 is preferably through a suitable contact and slip-ring. The plates 26 and 27 are so shaped that, during one revolution of the motor 28, the frequency generated by the oscillator is constant for an interval, then increases to a new value, remains constant at this new value for an interval, then decreases to the original value. Assume the plate 27 is rotated clockwise. When the edge $a$ of the plate 27 is in line with the edge $b$ of the plate 26, the capacitance is a minimum. The capacitance is a minimum, and the frequency of the oscillator is constant until the edge $c$ of plate 27 is in line with edge $d$ of the plate 26. The capacitance between the plates 26 and 27 increases and the frequency of the oscillator changes until the edge $c$ of plate 27 is in line with edge $b$ of plate 26. The capacitance between plates 26 and 27 is then a maximum, and the frequency of the oscillator is a constant at a new value, until edge $a$ of plate 27 is in line with edge $d$ of plate 26. The capacitance between the plates 26 and 27 decreases, and the frequency of the oscillator changes until the edge $a$ of plate 27 is in line with edge $b$ of plate 26.

Let the oscillator 1 have an angular frequency $$\omega = \omega_0 + at \quad (1)$$

from $-t_0$, when the edge $a$ of plate 27 is in line with the edge $d$ of plate 26, to $+t_0$ when the edge $a$ of plate 27 is in line with the edge $b$ of plate 26. On either side of these limits the angular frequency will be $\omega_0 - at_0$ and $\omega_0 + at_0$.

Let $x$ equal the time to transmit the wave from antenna 4 to antenna 5, a distance $D = D_0 + vt$, where $v$ is the component of the relative velocity between the bodies in the direction of transmission.

The wave received at the relay station is $$\cos\left(\omega_0(t-x) + \frac{1}{2}a(t-x)^2\right)$$

and this is heterodyned by the oscillator 8 of frequency $W$, so that the wave radiated by antenna 11 is $$\cos\left(Wt - \omega_0(t-x) - \frac{1}{2}a(t-x)^2\right)$$

The signal reaches the antenna 12 in substantially $x$ seconds, thus the wave received by antenna 12 is $$\cos\left(W(t-x) - \omega_0(t-2x) - \frac{1}{2}a(t-2x)^2\right)$$

The oscillator 14 produces a frequency $W'$ which combines, in the demodulator 13, with the wave from the oscillator 1 to produce a wave $$\cos\left(W't - \omega_0 t - \frac{1}{2}at^2\right)$$

This wave is combined in the demodulator 16 with the wave received by the antenna 12 to produce a wave $$\cos\left[(W - W' + 2ax)t + (2\omega_0 - W)x - 2ax^2\right]$$

Now, $x$ the time of transmission is approximately equal to $$\frac{D}{C} = \frac{D_0 + vt}{C}$$

where $C$ is the velocity of propagation in the medium, thus, the wave produced by the demodulator 16 is $$\cos\left[\left[W - W' + (2\omega_0 - W)\frac{v}{C} + \frac{2aD_0}{C}\left(1 - \frac{2v}{C}\right)\right]t + 2\frac{avt^2}{C}\left(1 - \frac{v}{C}\right) + \frac{2D_0}{C}\left(\omega_0 - \frac{W}{2} - \frac{aD_0}{C}\right)\right] \quad (2)$$

In the preliminary adjustment the oscillator 1 was set at a constant frequency preferably in the middle of the transmitted band, thus $a$ was zero and $W'$ was adjusted to zero beat frequency, then $$W - W' + (2\omega_0 - W)\frac{v}{C} = 0 \quad (3)$$

As thus adjusted, the frequency sweep began at $-t_1$ and continued to $+t_1$, during which time the wave transmitted through the filter 18 is given by $$\cos\left[\frac{2aD_0}{C}\left(1-\frac{2v}{C}\right)t+\frac{2av}{C}\left(1-\frac{v}{C}\right)t^2+\frac{2D_0}{C}\left(\omega_0-\frac{W}{2}-\frac{aD_0}{C}\right)\right] \quad (4)$$

The number of beats counted by the cycle counter 19 is $$N=\frac{2aD_0}{\pi C}\left[1-\frac{2v}{C}\right]t_1 \quad (5)$$

thus, as $$\frac{2v}{C}$$

is small, $$D_0=\frac{\pi C}{2at_1}N \quad (6)$$

and, since the total sweep in frequency of the oscillator 1 is $$\Delta f=\frac{at_1}{\pi}$$

$$D_0=\frac{C}{2\Delta f}\cdot N \quad (7)$$

What is claimed is:

1. The method of determining the distance between two bodies moving relatively to each other which comprises the steps of generating at one body waves initially constant in frequency, varying the freqeuncy of said waves to a second constant frequency, radiating waves produced by said generation to the second body, receiving said waves at said second body, changing by a fixed amount the frequencies of said received waves, reradiating said waves of changed frequencies, receiving the reradiated waves at said first body, changing the frequency of waves produced by said generation by an amount equal to but opposite in sense to the change in frequency of the received waves due to the relative motion of said bodies, combining said received waves of changed frequencies with said generated waves of changed frequencies to produce a wave, and counting the number of cycles of said latter wave to indicate the distance between said bodies.

2. The method of determining the distance between two bodies moving relatively to each other which comprises generating at one body waves of constant frequency, radiating said waves to the second body, reradiating said waves back to the first body, receiving the reradiated waves at said first body, changing the frequency of a portion of the generated waves, combining said received waves with said waves of changed frequency to produce a difference wave, adjusting the change in the frequency of said portion to make the frequency of said difference wave zero, then varying the frequency of said generated waves through a predetermined sweep, and counting the number of cycles in said difference wave during said sweep to determine the distance between said bodies.

3. In combination, two bodies moving relatively to each other, a source of waves on one body, means for transmitting waves from said source to the second body means on said second body for receiving said transmitted waves, means, including a local source of waves, for changing the frequency of the waves received on said second body, means for retransmitting said waves of changed frequency to said first body, means, including a second local source of waves, for changing the frequency of waves from said first source, means for comparing the frequency of the waves received from said second body with the waves of changed frequency from said first source and means for adjusting the frequency of the waves from said second local source until the difference in frequency between said received waves and said waves of changed frequency is reduced to a small value, means for varying the frequency of the waves from said first source over a predetermined range, and means for measuring the difference in frequency between the received waves and the waves of adjusted changed frequency during said variation in frequency of the waves from said first source.

JOHN C. SCHELLENG.

REFERENCES CITED

The following references are of record in the file of this patent:

UNITED STATES PATENTS

| Number | Name | Date |
|---|---|---|
| 1,750,668 | Green | Mar. 18, 1930 |
| Re. 21,955 | Chaffee | Nov. 25, 1941 |